(12) United States Patent
Huffman

(10) Patent No.: US 7,509,977 B2
(45) Date of Patent: Mar. 31, 2009

(54) VARIABLE DISCHARGE SLUDGE DISTRIBUTOR

(75) Inventor: Thomas R. Huffman, Minnetrista, MN (US)

(73) Assignee: Hydro Engineering, Inc., Young America, MN (US)

( * ) Notice: Subject to any disclaimer, the term of this patent is extended or adjusted under 35 U.S.C. 154(b) by 221 days.

(21) Appl. No.: 10/939,717

(22) Filed: Sep. 13, 2004

(65) Prior Publication Data

US 2006/0042703 A1 Mar. 2, 2006

Related U.S. Application Data

(60) Provisional application No. 60/605,941, filed on Aug. 31, 2004.

(51) Int. Cl.
  *A01C 23/00* (2006.01)
  *F16K 11/02* (2006.01)
(52) U.S. Cl. .............. 137/625.15; 137/271; 137/625.11
(58) Field of Classification Search ................ 137/271, 137/625.11, 625.15
  See application file for complete search history.

(56) References Cited

U.S. PATENT DOCUMENTS

| | | | | |
|---|---|---|---|---|
| 1,228,469 | A | * | 6/1917 | Mueller .................. 137/625.11 |
| 1,522,335 | A | * | 1/1925 | Sherman ................. 137/625.11 |
| 2,204,276 | A | * | 6/1940 | Lass ....................... 137/625.11 |
| 3,307,579 | A | * | 3/1967 | Beddoes ................. 137/625.11 |
| 4,574,842 | A | * | 3/1986 | Cordova ................. 137/625.15 |
| 5,271,567 | A | * | 12/1993 | Bauer ........................ 239/662 |
| 5,272,992 | A | * | 12/1993 | Barbour et al. ............. 111/120 |
| 5,435,493 | A | * | 7/1995 | Houle ........................ 239/662 |
| 6,202,942 | B1 | * | 3/2001 | Hultgreen et al. ....... 239/214.15 |
| 6,378,509 | B1 | * | 4/2002 | Feucht et al. .......... 123/568.12 |
| 6,427,612 | B1 | | 8/2002 | Huffman .................... 111/118 |

FOREIGN PATENT DOCUMENTS

CA 2275045 * 12/1999

OTHER PUBLICATIONS

Hydro Engineering Inc.,Injector Manifold Agitator CAD Drawing, on-sale in U.S. prior to Aug. 31, 2003, 1 page.
Vogelsang ExaCut Slurry Distributor, printed material from Internet, admitted published prior to Aug. 31, 2003, 3 pages.

(Continued)

*Primary Examiner*—John Rivell
(74) *Attorney, Agent, or Firm*—Craig Taylor Law Office, PLLC

(57) ABSTRACT

Devices and methods for evenly distributing sludge, including manure and industrial sludge, to numerous hoses, over a large range of sludge supply pressures. Some devices include a housing having an inlet for receiving sludge under pressure and several outlets disposed outwardly through the housing cylindrical wall for coupling to hoses. The devices can include a rotating plate within the housing sweeping one or more baffles over the outlets to momentarily occlude the outlets and reduce flow through the occluded outlets. The baffles can include a first portion secured to the plate and a second portion removably secured to the first portion and/or the plate. Changing the total length of the baffles can change the affective cross-sectional area of the outlets available for flow at any instant in time. Increased sludge supply pressure may call for installing smaller sized baffles to reduce back pressure, while decreased sludge supply pressure may call for installing larger sized baffles to maintain sufficient back pressure to insure even flow. Even manure distribution onto fields over different pressure ranges can be provided.

18 Claims, 9 Drawing Sheets

OTHER PUBLICATIONS

Vogelsang DOSI-CUT Slurry Distributor, printed material from Internet, admitted published prior to Aug. 31, 2003, 18 pages.

Vogelsang DOSI-MAT Slurry Distributor, printed material from Internet, admitted published prior to Aug. 31, 2003, 8 pages.

* cited by examiner

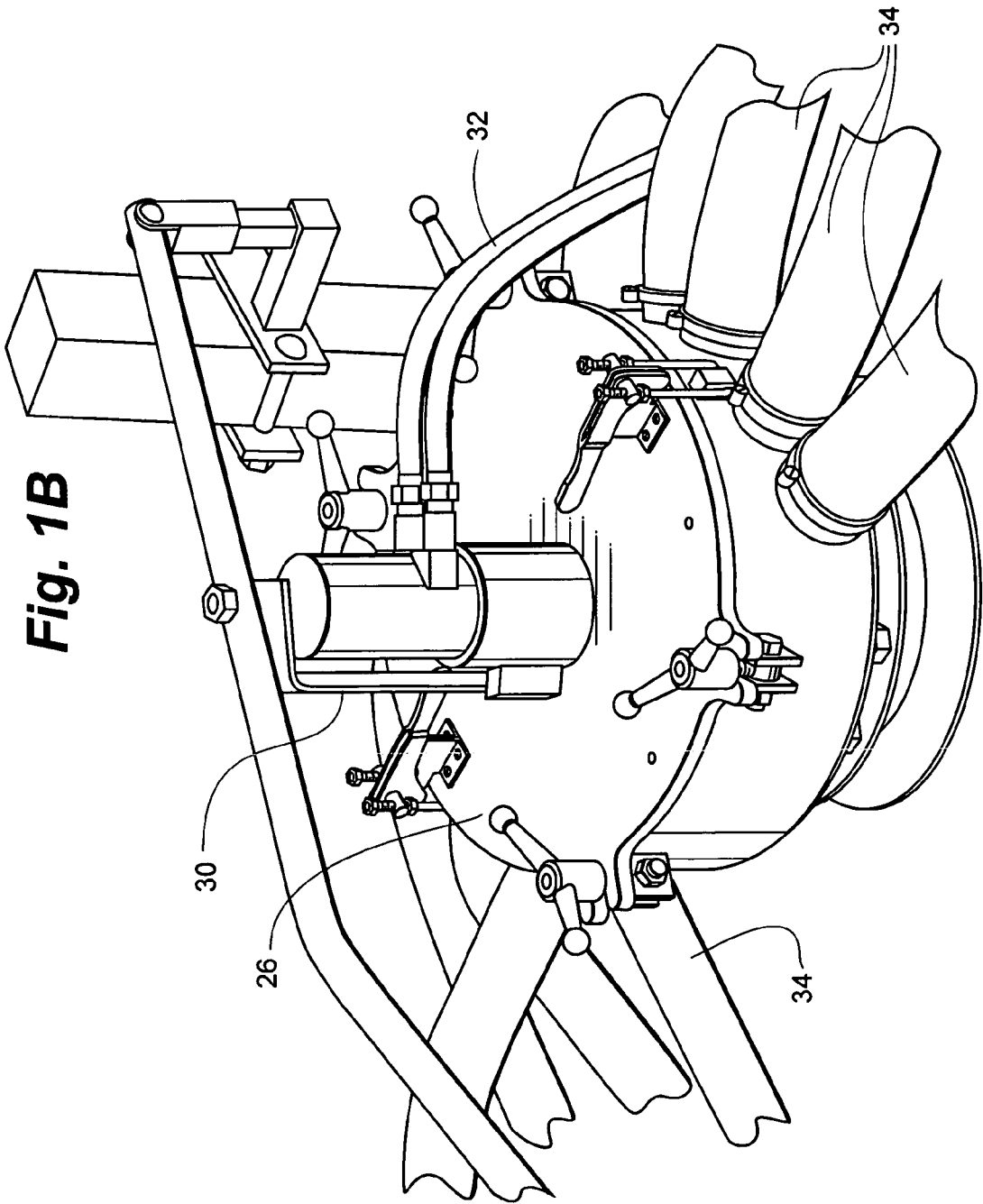

VARIABLE DISCHARGE SLUDGE DISTRIBUTOR

RELATED APPLICATIONS

The present application is a non-provisional of U.S. Provisional Patent Application No. 60/605,941 filed Aug. 31, 2004, entitled VARIABLE DISCHARGE OCCLUSION SLUDGE DISTRIBUTOR, herein incorporated by reference in its entirety.

FIELD OF THE INVENTION

The present invention is related generally to devices for handling manure and sludge. More specifically, the present invention is related to sludge and manure manifolds for distributing pumped sludge to multiple hoses.

BACKGROUND OF THE INVENTION

Modern farming techniques often rely on efficiency of scale for survival and profitability. In one example, animal raising and feeding is often done at a central facility having a large number of animals. Chickens, turkeys, pigs, and cows are often housed at a large facility, with the resulting generation of large quantities of manure. This manure is collected and stored. The manure storage pit may be quite large in some instances. Some storage pits or lagoons are about 800 feet long, 250 feet wide, about 20 feet deep, and can hold about 30 million gallons of manure.

The manure may ultimately be spread onto a field for two reasons: first, to dispose of the manure, and second, to apply fertilizer to the field. The manure is often applied only in the spring and fall in some regions. The manure is often not spread when it either will not be absorbed or cannot be applied because of the presence of crops. The manure is thus held for a long time period of several months.

At appropriate times, the manure is spread on the fields. While it is possible for a single farm to invest in the specialized equipment, and to use this equipment only twice a year, this is often not done. Instead, service providers buy the equipment and travel from site to site, pumping out the manure lagoons onto the fields.

This is often done by positioning a floating barge or dredge on the lagoon surface, and coupling the moving barge to the lagoon edge using a floated hose or pipe of some sort. Sometimes the hose or pipe empties into a storage tank. In other systems, the same hose or pipe, or a different hose or pipe, can continue from the lagoon to a tractor pulling a manure tillage injector or sprayer. The tractor can travel back and forth over the fields, with the hose trailing behind, spreading the manure on the fields. The hose length may be on the order of a mile. So-called "lay-flat" hose is currently used. Lay-flat hose lies flat when not pressurized, rather than remain round. A hard hose that remains round is also used. The manure distribution is also accomplished by pumping the manure into a tank, which may then be pulled behind a tractor and the manure spread onto or into the field. Manure distribution is further described in commonly assigned U.S. Pat. No. 6,427,612, herein incorporated by reference.

In a related use, industrial or municipal sludge can also be disposed of on, or into, a field. Such sludge is typically the sludge left over from wastewater processing. The wastewater may be municipal wastewater or wastewater from a processing plant, for example a food processing plant, that may be disposed of on a field. As used herein, the term "sludge" refers to both manure and wastewater sludge, both having a sufficient amount of liquid to allow for pumping the sludge.

Whether using a drag hose system or a tank system, it is normally desirable to apply the sludge evenly over the fields. If too much sludge is applied in an area, it may not be absorbed in to the ground, and may result in run-off. Too much sludge in one spot may also be harmful to crop plants growing there. Excessive sludge may also not be utilized by plants, with nitrates ending up in the ground water, an undesirable situation.

Too little sludge is also undesirable, as crops dependent on the sludge for fertilizer may receive little or no fertilizer. Crop roots typically reach only about the extent of the canopy, and no further. Thus, an acceptable "average" sludge distribution consisting of alternating high and low areas along a crop row may result in unacceptable variations in crop growth. Even sludge distribution is therefore important for crop production and environmental issues.

Sludge distributors or manifolds are often found carried near the tanks or at the end of the drag hoses. Examples of such sludge distributors are made by Vogelsang (Hugo Vogelsang Maschinenbau GmbH, Holthöge 10-14, D-49632 Essen/OI.) (www.vogelsang-gmbh.com), under the DOSIMAT, DOSICUT, AND EXACUT brand names. The distributors are distributed by Vogelsang USA (Twinsburg Ohio).

The distributors are often selected for a limited pressure and flow range. Specifically, the pressure delivered by a pump from a tank or from the manure lagoon is known or estimated, and the proper distributor selected. Many current distributors were developed for use with tanks, and are now used with drag hose systems. The proper selection of a sludge distributor is important. If the backpressure built up within the distributor drops too low, then uneven sludge distribution will likely result. If the backpressure becomes too high, then the sludge distribution may be even, but much energy is wasted.

In one example, a distributor may be initially installed for a range of 400-600 GPM, but a range of 1200-1400 GPM may later be desired. It might be possible to meet this higher range, but at the cost of significantly higher pressure and the resultant energy wastage. The range of flow rates expected through hose drag systems can be large, from 200-1600 GPM. These large ranges are difficult to achieve without either wasting energy to maintain a large backpressure or dropping too low to insure even distribution.

Applicant believes that current systems address this problem by replacing the entire distributor, or operating using the initial distributor with large backpressure or uneven flow.

What would be desirable is a system for delivering sludge to multiple hoses at an even flow rate; with little excess back pressure, over a large range of flow rates.

SUMMARY OF THE INVENTION

The present invention provides devices and methods for evenly distributing sludge, including manure and industrial sludge, to numerous hoses; over a large range of sludge supply pressures and flow rates. Some devices include a housing having an inlet for receiving sludge under pressure and several outlets disposed outwardly through the housing cylindrical wall for coupling to hoses. The devices can include a rotating plate within the housing sweeping one or more baffles over the outlets to momentarily occlude the outlets and reduce flow through the occluded outlets. The baffles can include a first portion secured to the plate and a second portion removably secured to the first portion and/or the plate. Changing the total length of the baffles can change the affective cross-sectional area of the outlets available for flow at any instant in time. Increased sludge supply pressure may call for installing smaller sized baffles to reduce back pressure, while decreased sludge supply pressure may call for installing larger sized baffles to maintain sufficient back pressure to insure even flow. Even manure distribution onto fields over different pressure and flow ranges can be provided.

In one embodiment, a sludge distributor includes a housing having a chamber within, an inlet, and a wall extending around the center axis, where the wall has a several orifices extending through the wall. The distributor may also include a rotatable portion rotatably disposed within the chamber about the axis, the rotational portion having a body and at least one sidewall connected to the body. The sidewall can be disposed only partially arcuately about the center axis, and be disposed to block at least some but not all of the orifices. Rotating the rotatable portion within the housing causes at least one sidewall to move past and block varying members of the orifices with varying rotational position.

In some distributors, at least one sidewall is removably secured to the rotatable portion body. The sidewall may include a fixed portion fixedly secured to the rotatable portion body and a removable portion removably secured to the rotatable portion body. Some distributors include a second sidewall coupled to the rotatable portion body. A rotor may be rotatably coupled through the housing and to the rotatable portion body. A motor may be coupled to the rotor.

Several pipe nipples may be secured to the housing about the orifices to provide a coupling point for a plurality of hoses coupled to the orifices. Some housing chambers have an interior wall disposed about the orifices, where the sidewall has an exterior surface that approaches within about ¼ inch or less from the wall interior surface. The sidewall may reduce flow through a blocked orifice by at least 50% relative to an unblocked orifice. Each sidewall may totally block a sight path between the center axis and an orifice when the sidewall is centered on the orifice, in some embodiments.

The present invention also can provide a sludge distributor having a central rotational axis therethrough and a longitudinal plane orthogonal to the axis, with the distributor including a housing having a cavity within, an inlet extending through the housing and into the cavity, and several orifices extending through the housing. The orifices can be disposed about the central axis and lie substantially within the plane. At least one baffle can be disposed within the housing cavity, be configured to travel rotationally about the central axis, and have an arcuate length disposed against and blocking at least one of the orifices. Rotating the at least one baffle within the housing about the central axis may block varying orifices with rotational travel of the baffle.

In some distributors, the baffle has an arc length of at least about 30 degrees of arc. The baffle may reduce flow by least 50% when centered on one of the orifices. In some distributors, the baffle approaches within about ¼ inch or less of the housing interior wall. In some devices, the baffle has an outward surface facing away from the central axis that is substantially equidistant from the central axis over the outward surface.

The present invention also provides a method for varying the effective number of orifices open at any one time in a sludge distributor, where the distributor includes a housing having an interior wall and several hose outlets disposed circumferentially about the housing. At least one first baffle has a first arcuate length and is configured to travel about the housing interior near the housing interior walls and blocks at least one of the orifices at any one time. The method can include replacing the first baffle with a second baffle having a second arcuate length that is different from the first arcuate length.

The present invention can also provide a method for distributing sludge including pumping the sludge through a conduit into a housing interior having a plurality of holes extending through the housing and disposed about the interior. The sludge is allowed to flow out of the housing through a first set of the holes, while some of the holes are blocked to reduce the sludge flowing through a second set of holes. The holes blocked and the holes having sludge flowing therethrough varies regularly with time.

The holes blocked may be blocked by at least one member having a length and traveling within the housing. In some methods, the blocking includes rotating a body about a central axis within the housing, the body having the at least one or two blocking members removably secured to the body.

The method may also include replacing the at least one member with another member having different length, such that a different number of holes are blocked at any one time. A majority of the holes may be blocked for no more than about 1 second in some methods. A majority of the holes may be automatically both at least partially occluded and at least substantially un-occluded during the course of a 10 typical second interval. Flow may be reduced by at least about 50% through one of the holes when that hole is occluded.

DESCRIPTION OF THE DRAWINGS

FIG. 1B is a top, perspective view of the sludge distributor of FIG. 1A;

DETAILED DESCRIPTION OF THE PREFERRED EMBODIMENTS

Figure 1A:
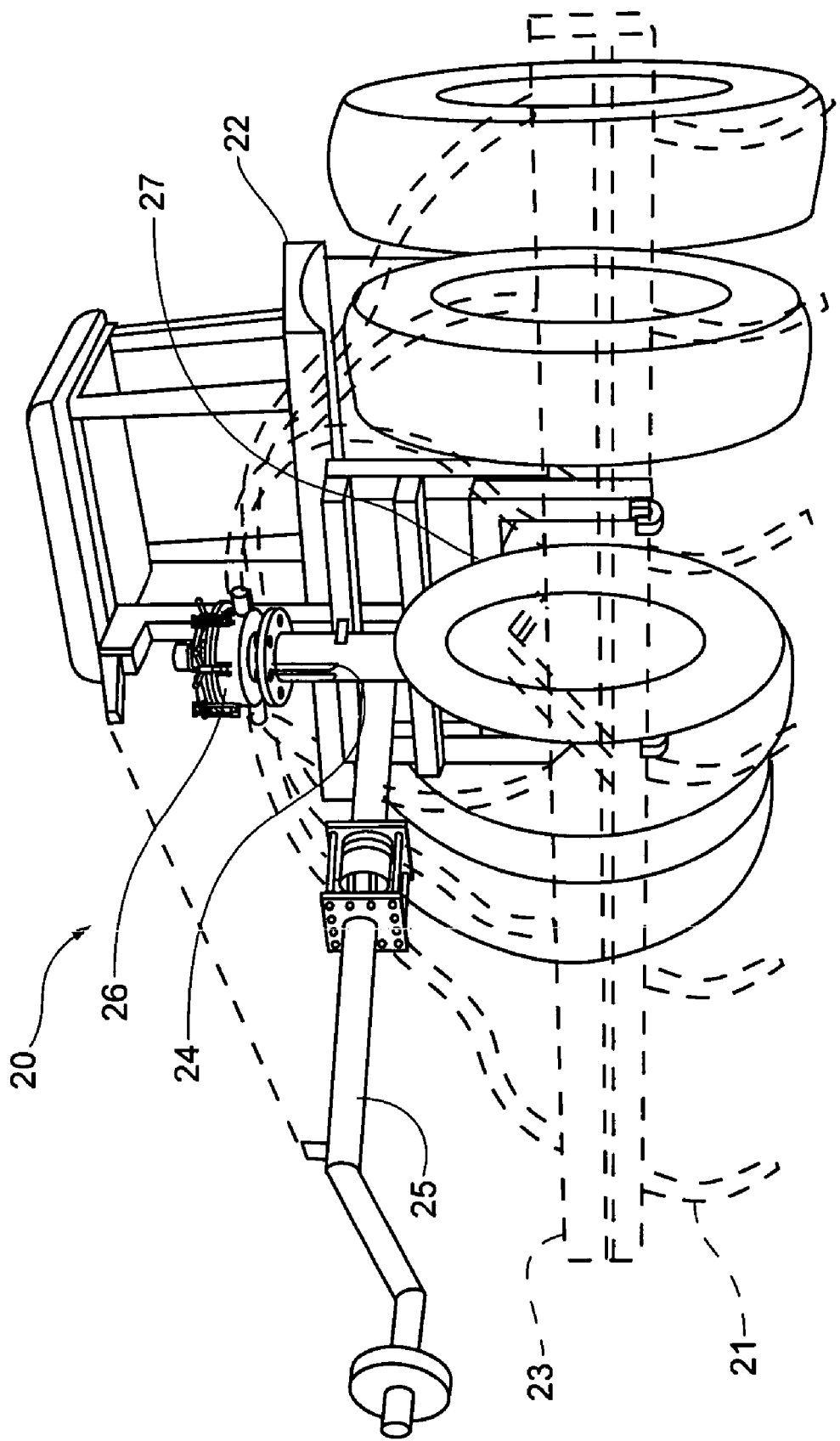
FIG. 1A is a fragmentary, perspective view of a sludge distributor mounted on a three-point hitch attached to a tractor.

FIG. 1A illustrates a system 20 for distributing sludge on a field, including a tractor 22, a drag hose-three point hitch assembly 24, and a sludge distributor 26. As is discussed later, sludge distributor 26 generally includes a hydraulic motor atop the distributor and numerous outlets 36 disposed about the periphery for coupling to sludge distribution hoses 34. System 20 also includes a swing arm 25, a hitch 27, and an attached tool bar 23 carrying cultivator tillage equipment 21.

FIG. 1B illustrates the distributor of 26 of FIG. 1B, further illustrating a hydraulic motor 30 powered by hydraulic hoses 32. Sludge distributor 26 includes numerous sludge distribution hoses 34 coupled to the housing outlets 36 for distributing sludge to the field.

Figure 2:
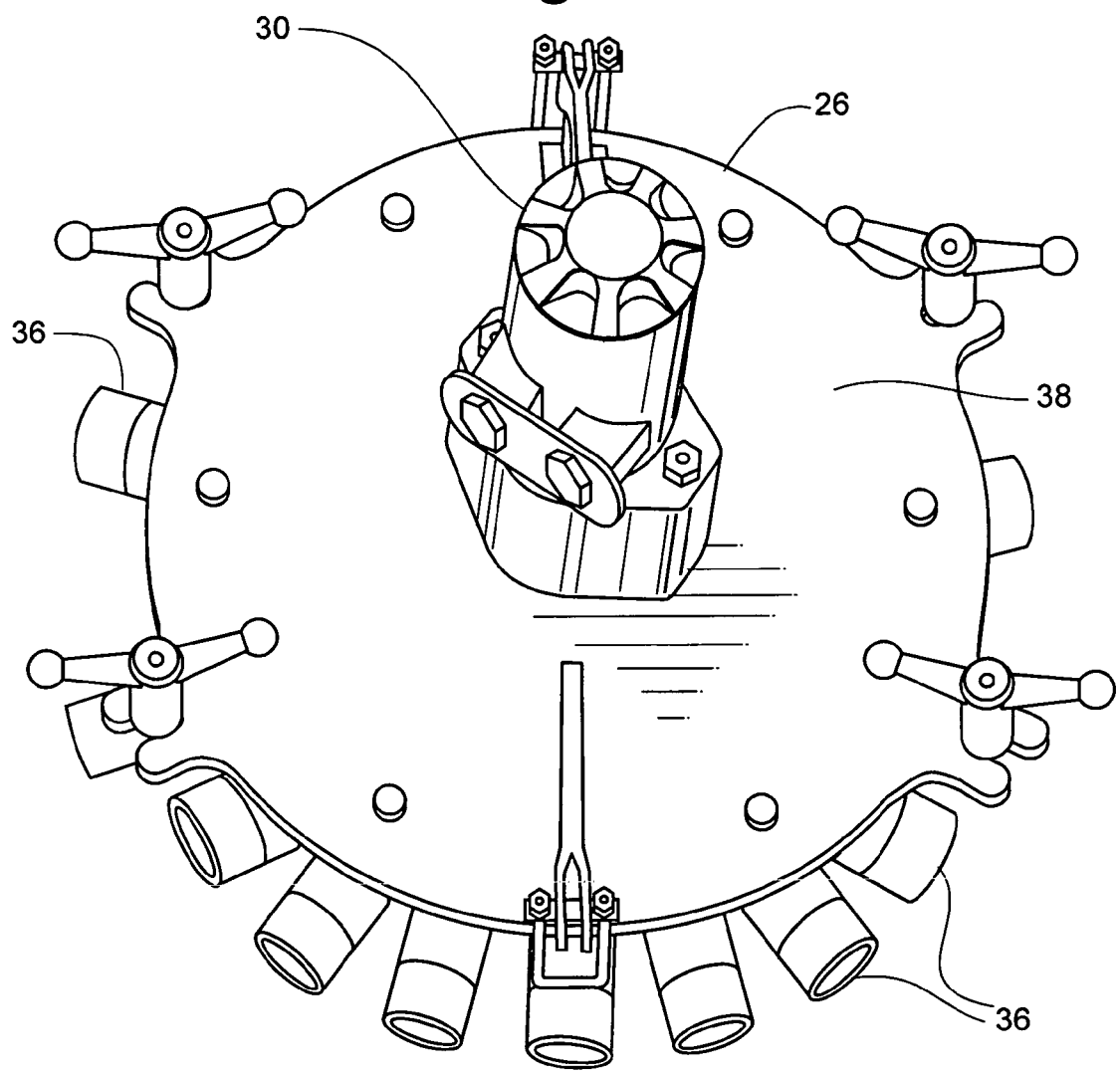
FIG. 2 is a, perspective view of the sludge distributor of FIG. 1B, including a housing having a top plate clamped to a cylindrical bottom portion with outlets disposed about the outlet bottom portion sides, and a hydraulic motor mounted above the top plate.

FIG. 2 illustrates sludge distributor 26 again showing hydraulic motor 30 coupled to a housing top plate or cover 38 which is clamped to the housing bottom portion, which includes several outlets 36 extending through the housing.

Figure 3:
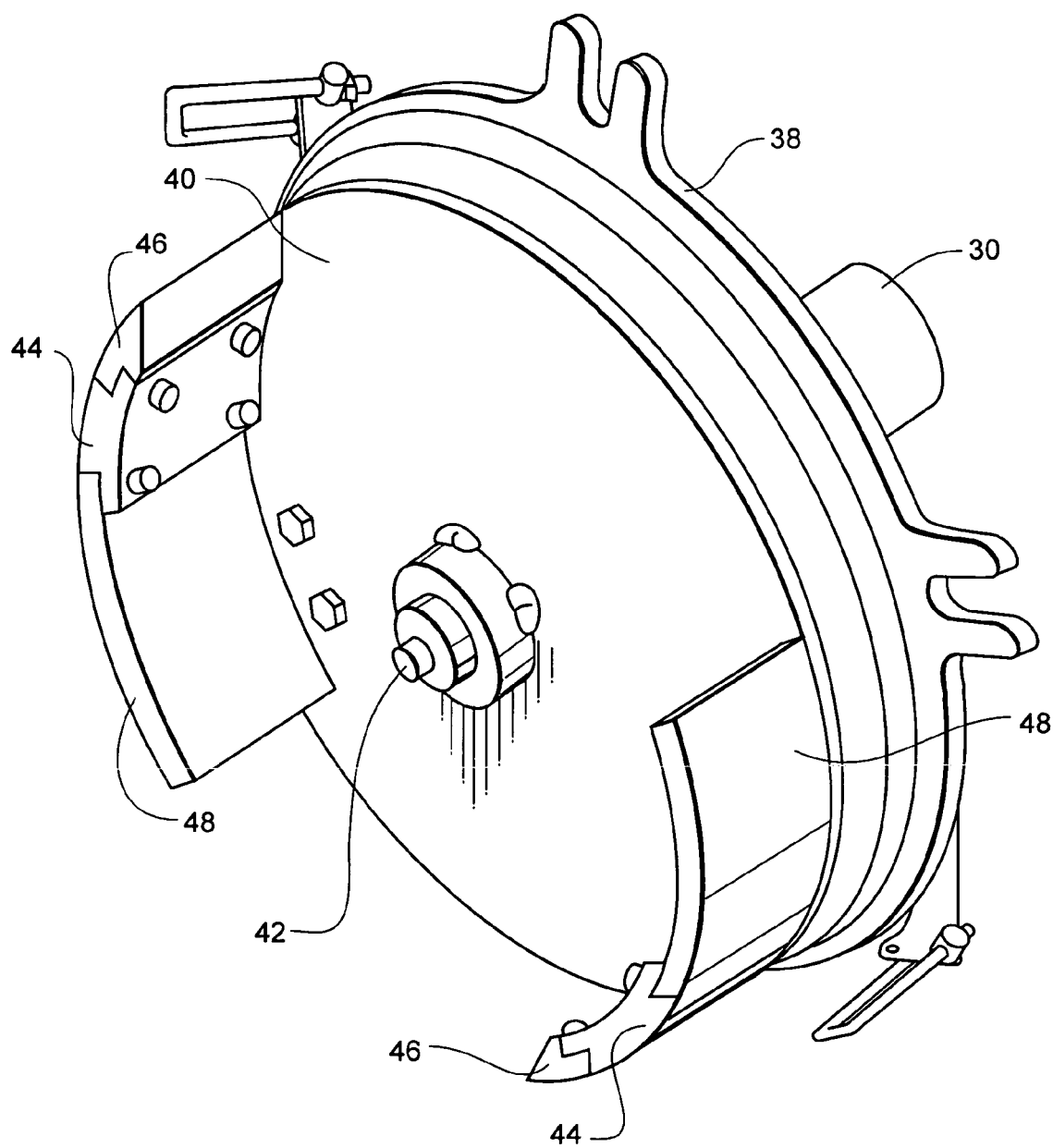
FIG. 3 is a perspective view of the housing top plate of FIG. 2 removed from the housing bottom, illustrating a rotatable top plate carrying arcuate wings or baffles for occluding the outlets of FIG. 2.

FIG. 3 illustrates housing top plate or cover 38 and motor 30, after being removed from the housing lower portion. A rotatable top plate 40 may be seen, rotatably disposed about a central axis shaft 42, with both central shaft 42 and rotatable top plate 40 being coupled to motor 30. Rotatable top plate 40 may be seen carrying two fixed wings or baffles 44. The terms "wings" and "baffles" are interchangeably herein. Each fixed wing 44 can be coupled to a removable cutting knife 46 and a removable wing 48. Rotatable top plate 40 preferably rotates with the removable cutting knife 46 as the leading edge and the removable wing 48 as the trailing edge, in normal operation. The normal rotation direction can be reversed when jams are incurred.

Figure 4:
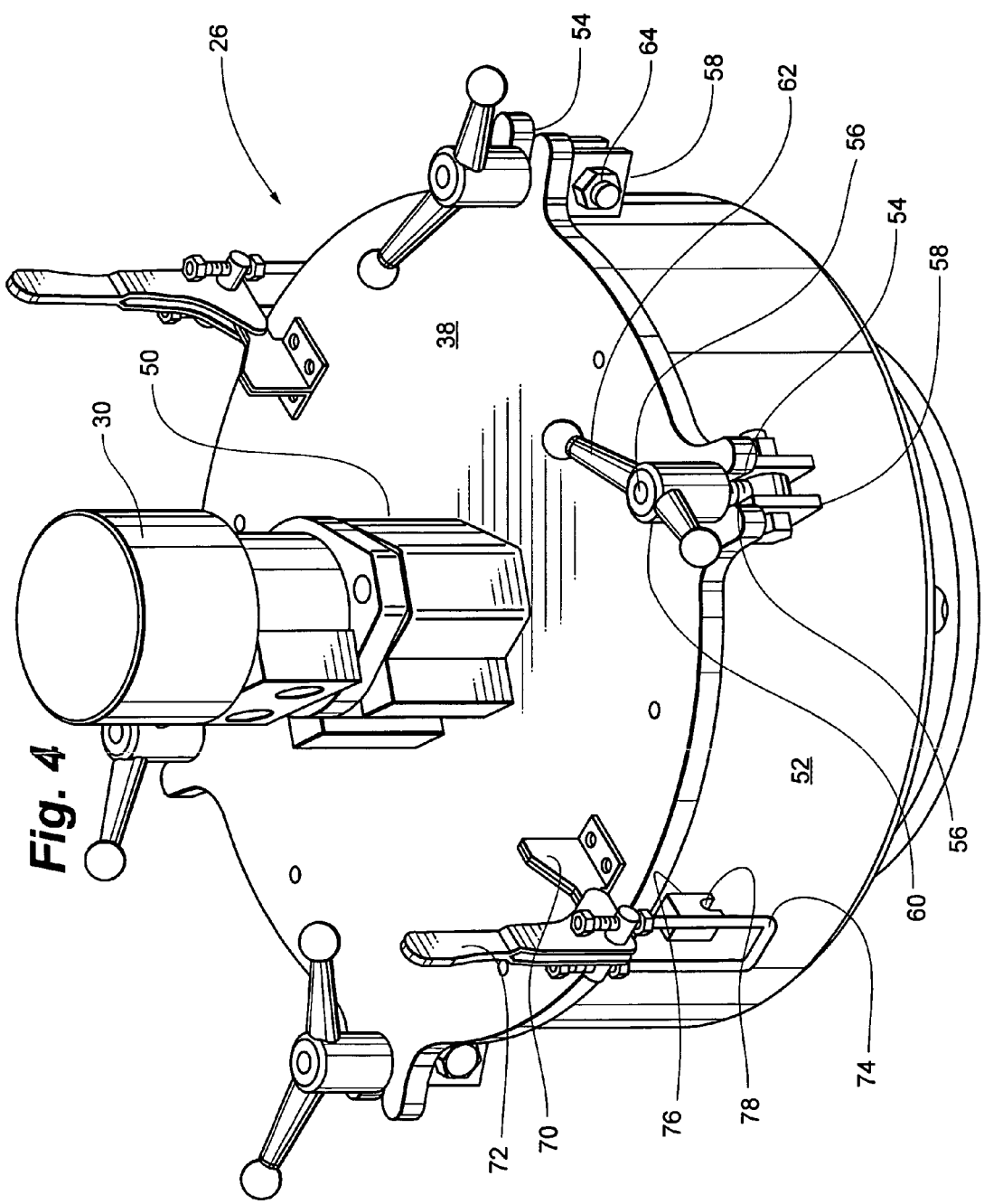
FIG. 4 is a perspective view of the sludge distributor of FIG. 2, with the outlets not shown.

FIG. 4 illustrates top housing top plate 38 and motor 30 coupled to the housing top plate through a mounting block 50. Housing top plate 38 also includes several ears 54 which can be used to receive an eyebolt 56 pivotally secured to a bolt-mounting bracket 58. A rotatable T-bolt fastener 60 having handles 62 can be used to receive bolt 56 and tighten housing top plate 38 downward through rotation of the handles 62 about the threaded bolt 56 within. Bolt 56 may be secured to mounting bracket 58 using a fastening bolt 64. Top plate 38 may also include a clamp tie-down assembly including a top mounting bracket 70 pivotally coupled to a camming handle 72 which can be used to pull a u-shaped bolt 74 upward into a recess 78 in a lower receiving bracket 76 which can be secured to the outer housing 52. Outer housing 52 can include a bottom portion and outer walls for securing top plate 38 thereto.

Figure 5:
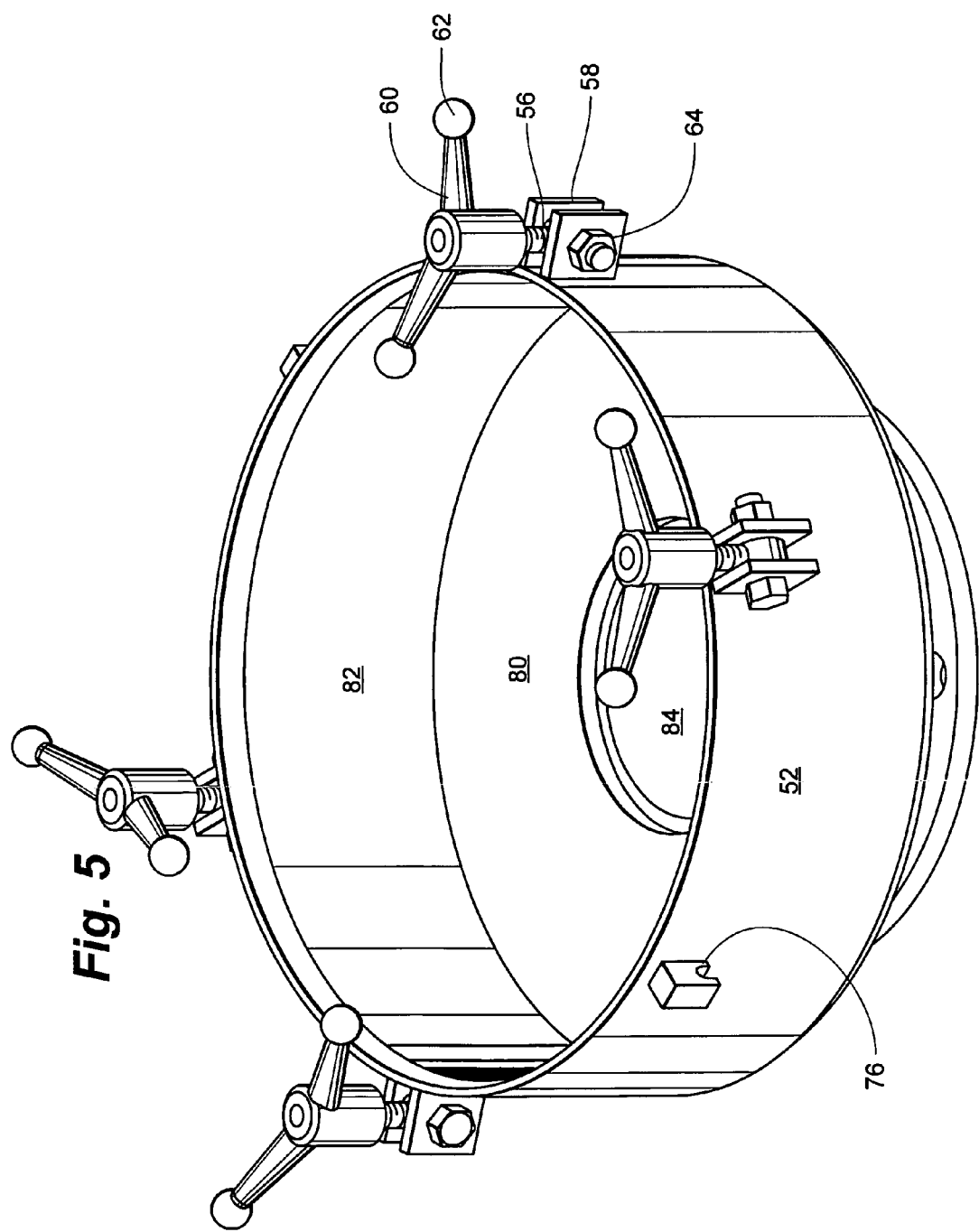
FIG. 5 is a perspective view of the housing bottom portion of the distributor of FIG. 4.

FIG. 5 illustrates housing bottom portion 52 which may be seen to include an inner cylinder or circular wall 82, a bottom surface 80, and a bottom inflow orifice 84. Bottom orifice 84 can be used to receive the sludge through an attached supply or in flow hose. Bottom orifice 84 can extend through a bottom pedestal portion 86 which can be used to mount the housing bottom portion 52 to the appropriate equipment and supply hose. Elements previously described are identically numbered in FIG. 5. It may be noted that the sludge can flow upward through orifice 84 and exit through the circumferentially spaced outlets 36 (not shown in FIG. 5) in walls 82, which are periodically occluded by the rotating fixed wing, removable wing, and cutting knife.

Figure 6:
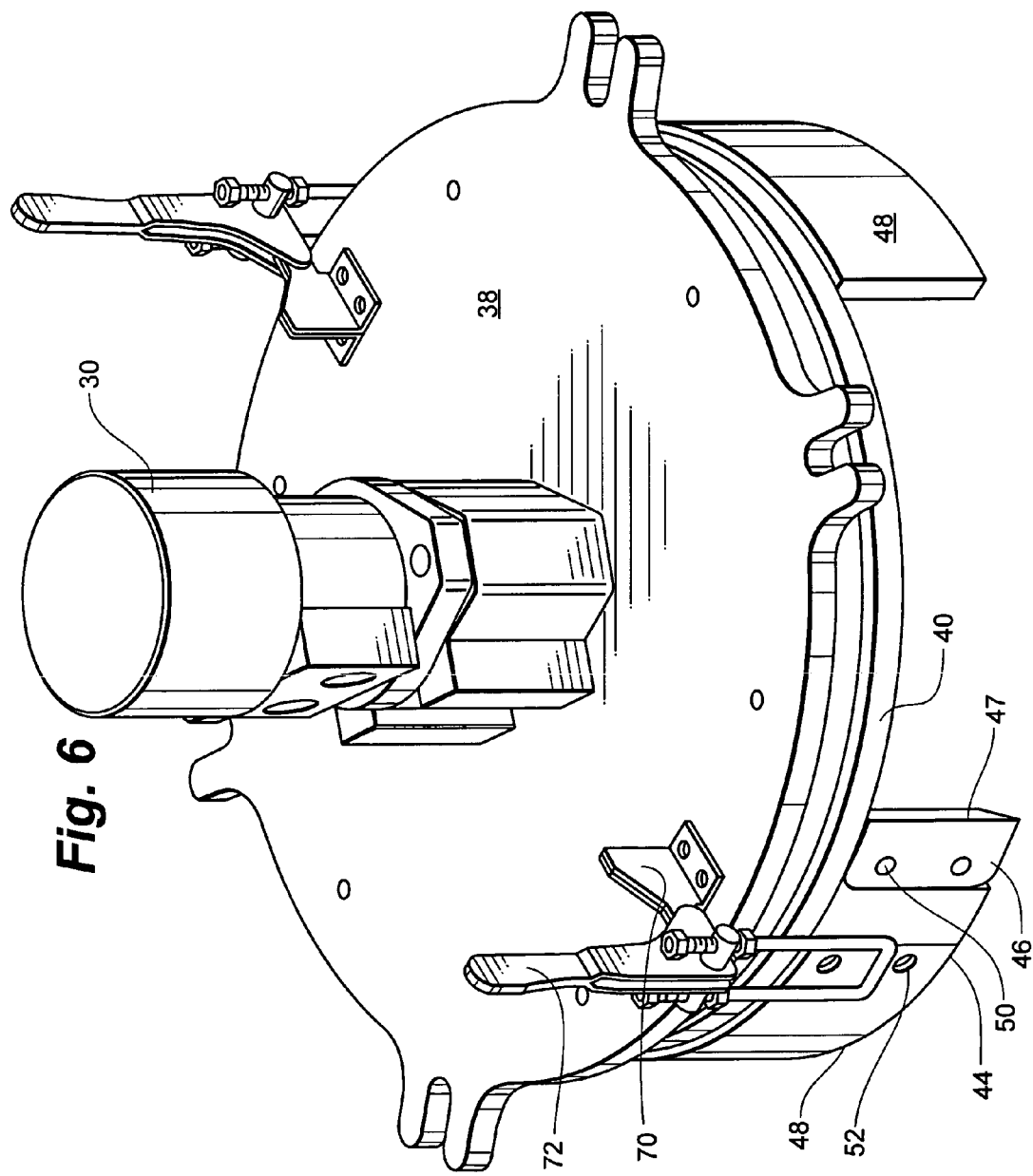
FIG. 6 is a perspective view of the housing top plate and the rotatable top plate carrying a fixed wing or baffle, which in turns carries a removable cutting knife, and a removable wing or baffle, with the rotatable top plate coupled to the hydraulic motor through the housing top plate.

FIG. 6 illustrates motor 30 and housing top plate 38 removed from the outer housing, carrying rotatable top plate 40, which in turn carries a fixed wing 44, a removable wing 48, and a cutting knife 46. Cutting knife 46 may be seen to include a sharp leading edge 47 which can be beveled as illustrated. In some embodiments, fixed wing 44 is narrower (in the circumferential dimension) in the radially outward direction than the inward direction. Specifically, fixed wing 48 can be narrow on the outside and wider on the inside, for receiving mounting bolts which can be inserted through cutting knife mounting holes 50 and removable wing mounting holes 52.

Figure 7:
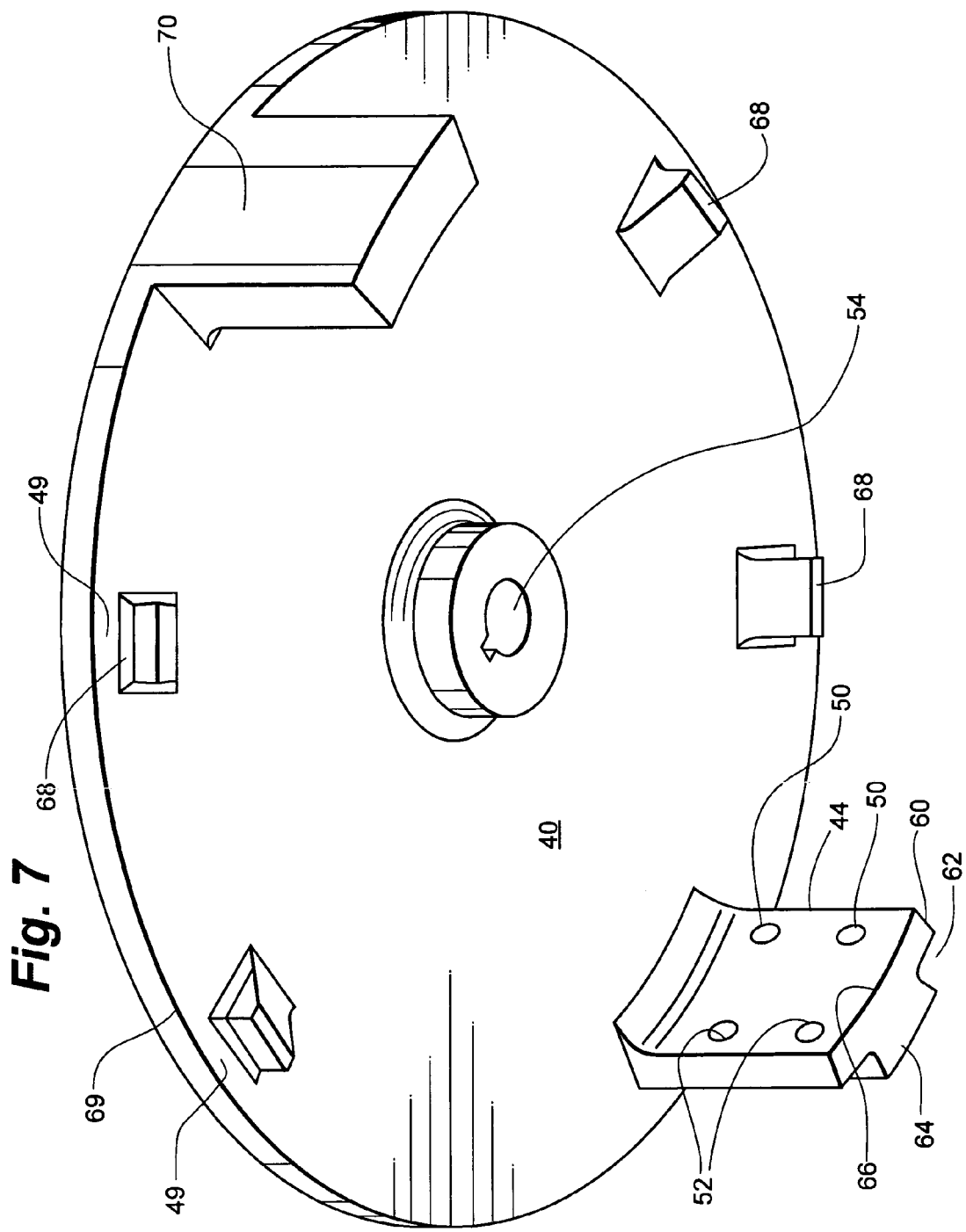
FIG. 7 is a perspective view of the rotatable top plate of FIG. 6, illustrating one fixed wing or baffle machined from a casting and the other fixed wing or baffle prior to machining, as well as several stops to limit movement of the removable wings or baffles.

FIG. 7 shows rotatable top plate 40 including a central orifice 54 for receiving a drive shaft that can be coupled to a motor, for example the hydraulic motor previously shown. One fixed wing 44 is shown, having mounting holes 50 for receiving mounting bolts from the cutting knife and another pair of mounting holes 52 for receiving mounting bolts from the arcuate removable wings. The removable wings may be bolted to the holes 50 and the cutting knife may be secured to the mounting holes 52, in some embodiments. Dashed lines 60 indicate where a solid casting may be removed to leave a removed portion 62. The removed or machined away portion may thus form a narrow inner portion 64 and a wider outer portion 66, as previously described. This can allow for mounting the cutting knife and the removable wing portion, as previously described.

FIG. 7 also illustrates several stops 68 which can also be disposed about the circumference of top rotatable plate 40. Stops 60 can be used to limit the inward travel of the arcuate removable wing. Specifically, in the region indicated at 49, in some embodiments, the removable wing may extend between the stop 68 and an outer edge 69 of rotatable top plate 40. Stops 68 may be used in some embodiments to prevent bending of the removable wings. Specifically, while the cutting knifes are usually the leading edge in the rotation, when a rock or other object is encountered, the rotation may be significantly slowed or stopped by this foreign object. In an attempt to clear the object, rotation of the rotatable top plate 40 may be reversed. If the rock or other object is encountered by the now leading edge of the removable wing, this object could force the longer, removable wing, through its long lever arm, to bend inward and away from rotatable top plate outer edge 69. This is undesirable. Stop 68 can be used to limit the inward travel of the arcuate removable wings.

The fixed wing 70 is also illustrated in FIG. 7, shown in a configuration after casting but prior to any machining to receive the cutting knife and any removable wing. Thus, rotatable top plate 40 and fixed wing 70 may be cast from the same metal, and later further machined.

Figure 8:
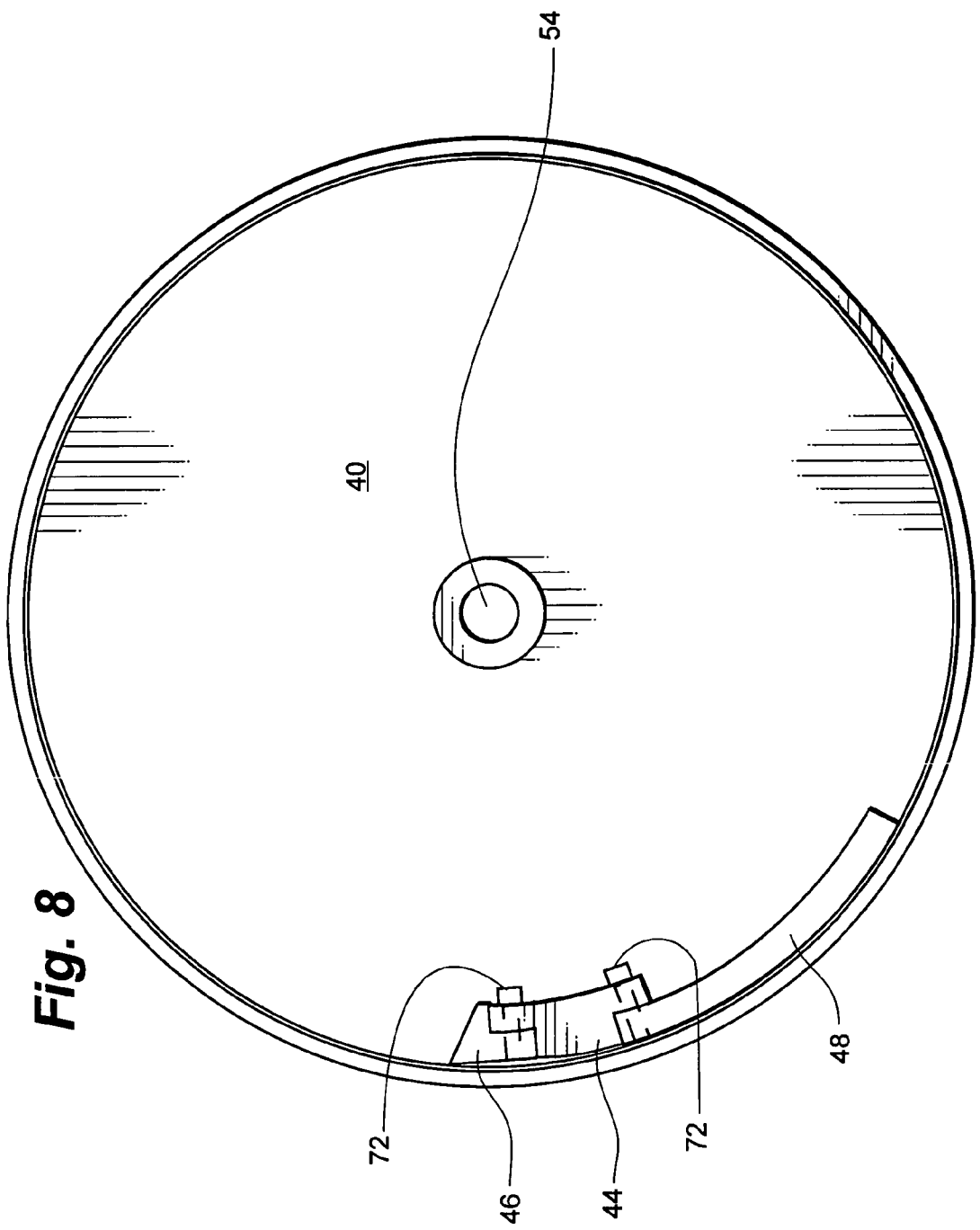
FIG. 8 is a bottom view, looking up, of a rotatable top plate showing a replaceable cutting knife, a fixed wing or baffle, and a removable wing or baffle for occluding sludge flow through the outlets.

FIG. 8 illustrates a view looking up to rotatable top plate 40 having hole 54 receiving the drive shaft of the motor. Fixed wing 44 is shown as is cutting knife 46 and removable wing 48. Mounting bolts 72 may be seen for securing cutting knife 46 and removable wing 48 to fixed wing 44. Only one wing is shown in FIG. 8.

FIG. 8 illustrates but one embodiment of the present invention. Comparison of FIG. 8 with FIG. 2 shows that the rotation of the fixed wing 44 and removable wing 48 will, at any instant, occlude flow through outlets 36. Sludge flow will thus come upward, or can come upward, from an inlet port 84 in an attempt to flow out from outlets 36 to the attached hoses. Fixed wing 44 and removable wing 48 will at least temporarily occlude the outlets. In some embodiments, the total length of the cutting knife, fixed wing, and removable wing is sufficient to block at least one, two, three, or even four outlets, depending on the embodiment. The specific instance of outlet blocked any one time will of course be changing with time and with rotation of rotatable top plate 40.

One embodiment is as illustrated in FIG. 8, having a removable, replaceable cutting knife 46 and a removable, replaceable wing 48. When cutting knife 46 becomes dull, it can be removed and replaced. Similarly, when removable wing 48 is no longer of the desired length, the specific removable wing 48 can be removed and replaced with a longer, shorter, or no removable wing. The number of outlets occluded may thus be increased or decreased depending on the length of the removable wing. The amount of the flow through the outlets can thus be varied by varying the number of outlets occluded at any instant in time. Some embodiments operate as illustrated in FIG. 8, by allowing the total removable, or replacement with longer or shorter removable wings, to achieve this effect. In other embodiments, a different top plate 40 can be put in place, having a longer or shorter fixed wing 44, with no removable wing. In either case, the number or percentage of outlets occluded at any one time can be varied while maintaining a minimum pressure to insure even flow through the outlets.

In a situation where low pressure sludge is provided, a longer removable wing can be put in place, in order to occlude a significant number of outlets at any instant in time, thus building a sufficient back pressure to insure even flow. Where high-pressure sludge is provided, the removable wing can be replaced with a shorter removable wing, or no removable wing, such that a smaller number of outlets are occluded at any instant in time. Different embodiments can have different numbers of wings disposed about the periphery of the rotatable top plate. Various embodiments can have one, two, three, four, or any number of wings to occlude the outlets in varying degrees. In some embodiments, at least 20, 40, or 60 degrees of arc are occluded in total by each cutting knife, fixed wing, and any removable wing combination. In some embodiments, the total degrees of arc occluded by the combination of all cutting knifes, fixed wings, and any removable wings at any instant in time can be at least 40, 60, 80, 90, 120, or 180 degrees of arc. As previously discussed, this can be accomplished by adding various lengths of removable wings or removing such wings. This can also be accomplished by replacing the rotatable top plate having varying degrees of arc occluded at any instant by any number of fixed and or removable wings.

The invention claimed is:

1. A sludge distributor having a center rotational axis, the distributor comprising:
    a pressurizable housing having a chamber within, an inlet thereinto, and a wall extending around the center axis, wherein the housing encloses the chamber and the housing is configured and adapted to maintain a supplied pressure within the housing, wherein the wall has a plurality of orifices extending therethrough; and
    a rotatable portion rotatably disposed within the chamber about the axis, the rotatable portion having a body and at least one sidewall connected to the body and disposed arcuately about the center axis and disposed to block at least some but not all of the orifices at all given instants in time, such that rotating the rotatable portion within the housing causes the at least one sidewall to move past and block different orifices with varying rotational position.

2. The distributor of claim 1, in which the at least one sidewall is removably secured to the rotatable portion body.

3. The distributor of claim 1, further compromising a second sidewall coupled to the rotatable portion body.

4. The distributor of claim 2, further comprising a rotor rotatably coupled through the housing and to the rotatable portion body.

5. The distributor of claim 4, further comprising a motor coupled to the rotor.

6. The distributor of claim 1, further comprising a plurality of pipe sections secured to the housing about the orifices to provide a coupling point for a plurality of hoses coupled to receive outflow from the orifices.

7. The distributor of claim 1, wherein the housing chamber has an interior wall having the orifices extending therethrough, wherein the at least one sidewall has an exterior surface that approaches within about ¼ inch or less from the wall interior surface.

8. The distributor of claim 1, in which the at least one sidewall includes a fixed portion fixedly secured to the rotatable portion body and a removable portion removably secured to the rotatable portion body.

9. The distributor of claim 1, wherein the sidewall reduces flow through a blocked orifice by at least 50% relative to an unblocked orifice.

10. The distributor of claim 1, wherein each sidewall totally blocks a sight path between the center axis and at least one orifice when the sidewall is centered on the orifice.

11. The distributor of claim 1, wherein each sidewall totally blocks a sight path between the center axis and at least two orifices at any instant in time.

12. The distributor of claim 1, wherein the sidewall is mounted perpendicular to the body.

13. The distributor of claim 12, wherein the body is a round plate.

14. The distributor of claim 1, wherein the body include a rotatable plate driven by a shaft, in which the plate is disposed to rotate substantially perpendicularly to the rotational axis.

15. The distributor of claim 14, wherein the rotatable plate does not substantially extend into a flow path between the inlet and the orifices.

16. The distributor of claim 14, in which the sidewall is arcuate in shape and has a leading edge and a trailing edge, the distributor further having a stop element secured to the plate and disposed at least partially radially inward of the sidewall trailing edge to limit inward travel of the sidewall trailing edge.

17. A sludge distributor having a central rotational axis therethrough and a longitudinal plane orthogonal to the axis, the distributor comprising:
    a pressurizable housing having a cavity within, an inlet extending through the housing and into the cavity, and a plurality of orifices extending through the housing the orifices disposed about the central axis and substantially within the plane; and
    at least one baffle disposed within the housing cavity, the baffle coupled to a body to travel rotationally about the central axis, and having an arcuate length disposed against and blocking at least one of the orifices, such that rotating the at least one baffle within the housing about the central axis blocks varying orifices with rotational travel of the baffle such that the body does not lie in a flow path between the inlet and the orifices in which the baffle includes a fixed portion secured to the body secured to a rotor and a removable portion having the arcuate length.

18. A method for distributing sludge onto a field, the method comprising:
    pumping the sludge under pressure while maintaining a backpressure through a conduit into a housing interior having a plurality of holes extending through the housing and disposed about the interior;
    allowing the sludge to flow out of the housing through a first set of the holes and onto the field while traveling at a rate over the feld;
    while blocking some of the sludge from flowing through a second set of holes, wherein the holes blocked and the holes having sludge flowing therethrough varies regularly with time, in which the blocking and unblocking and the sludge flowing rate are adapted to apply sludge evenly over the field;

wherein the holes blocked are blocked by at least one member having a length and traveling within the housing; and replacing the traveling blocking member having a length with a longer traveling member responsive to lower pressure sludge being provided to the sludge distributor and replacing the traveling blocking member having a length with a shorter traveling member responsive to higher pressure sludge being provided to the sludge distributor.

\* \* \* \* \*